(12) United States Patent
Maxik

(10) Patent No.: US 7,744,252 B2
(45) Date of Patent: Jun. 29, 2010

(54) SUSTAINABLY CONSTRUCTED HEAT DISSIPATING INTEGRATED LIGHTING SURFACE

(75) Inventor: Fredric S. Maxik, Indialantic, FL (US)

(73) Assignee: Lighting Science Group Corporation, Westampton, NJ (US)

( * ) Notice: Subject to any disclaimer, the term of this patent is extended or adjusted under 35 U.S.C. 154(b) by 0 days.

(21) Appl. No.: 12/192,506

(22) Filed: Aug. 15, 2008

(65) Prior Publication Data
US 2010/0039811 A1 Feb. 18, 2010

(51) Int. Cl.
*F21V 29/00* (2006.01)
(52) U.S. Cl. .................. 362/294; 362/373; 362/249.02
(58) Field of Classification Search ............... 362/218, 362/219, 294, 373, 249.01, 249.02; 361/704, 361/707, 709, 710
See application file for complete search history.

(56) References Cited

U.S. PATENT DOCUMENTS

| 4,340,929 A | | 7/1982 | Konikoff et al. |
| 5,857,767 A | * | 1/1999 | Hochstein .................. 362/294 |
| 6,061,243 A | * | 5/2000 | Barnett et al. ............... 361/704 |
| 2006/0181885 A1 | | 8/2006 | Seng Tong |
| 2007/0041220 A1 | * | 2/2007 | Lynch ......................... 362/646 |
| 2008/0089071 A1 | * | 4/2008 | Wang .......................... 362/294 |
| 2008/0192462 A1 | * | 8/2008 | Steedly et al. .............. 362/218 |

FOREIGN PATENT DOCUMENTS

| EP | 1041211 A2 | 10/2000 |
| EP | 1081426 A2 | 3/2001 |
| EP | 1361316 A1 | 11/2003 |
| EP | 1829674 A1 | 9/2007 |
| EP | 1933086 A1 | 6/2008 |
| WO | 2006097225 A1 | 9/2006 |
| WO | 2009029457 A1 | 3/2009 |

OTHER PUBLICATIONS

English Abstract for EP1081426(A2); Publication Date: Mar. 7, 2001; 1 pg.
English Abstract for EP1361316(A1); Publication Date: Nov. 12, 2003; 1 pg.
English Abstract for EP1933086(A1); Publication Date: Jun. 18, 2008; 1 pg.
European Search Report for Application No. 09167594.2; Date of Mailing: Dec. 11, 2009.

* cited by examiner

*Primary Examiner*—Thomas M Sember
(74) *Attorney, Agent, or Firm*—Cantor Colburn LLP

(57) ABSTRACT

A lighted heat dissipating panel made of sustainable renewable materials such as recycled aluminum and soy-based urethane, for use in architectural or shelving applications. The panel may be flat, rectangular, curvilinear, or of varying cross section so as to include any three-dimensional shape as desired. Lightweight materials such as carbon fiber, fiberglass, resin, soy-based urethane, and similar materials are used in combination with thermally conductive structural materials, such as expanded aluminum honeycomb, preferably fabricated from recycled aluminum, to provide a stiff, lightweight, machinable, moldable, and thermally conductive panel for use with lighting elements. Lighting elements are housed within the panel, providing illumination as desired. Heat is transferred from the lighting elements through the panel to the supporting structure and radiated from the panel itself, providing cooling effect for the lighting elements, reducing the temperature in the immediate vicinity of the lighting elements and providing for longer lighting element life.

7 Claims, 4 Drawing Sheets

US 7,744,252 B2

SUSTAINABLY CONSTRUCTED HEAT DISSIPATING INTEGRATED LIGHTING SURFACE

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to a lighted heat dissipating panel comprised of embedded light sources providing illumination as desired by a uses; more specifically, the present invention relates in at least one embodiment in which the heat dissipating panel is comprised of sustainable materials such as recycled expanded aluminum embedded in glass-carbon composite and in which the light emitting element is a Light Emitting Diode (LED), or a plurality of LEDs, which are in thermal contact with the light emitting surface whereby heat is transferred from the LEDs to the heat dissipating surface. The LEDs are thus cooled and are able to operate at a higher lumen output and with greater reliability than would otherwise be permitted in a non-cooled condition.

2. Background Art

Illuminated panels, for example illuminated shelving and illuminated panels used in architectural applications, have been used for many years and are generally well known in the relevant arts. Illuminated panels have many uses in architectural settings, merchandising settings, and the like. Such panels have generally depended upon either incandescent light elements or fluorescent light elements as the source of illumination embedded within the panel. However, recent advancements in LED technology have given rise to the production of cost efficient LED light elements that produce enough output power that they may be considered as light elements for architectural uses, area illumination, portable lighting such as flashlights, illuminated shelving applications, pool lighting and virtually any other lighting application that was formerly an incandescent or fluorescent lighting application. Such LED lighting has special benefits such as longevity of the light element itself, control over the spectrum of transmitted light, control over the intensity of the transmitted light, and energy efficiency as compared to the afore mentioned traditional light elements. It is thus desirable that LED light elements be utilized as a light element for illuminated panel applications.

As an example of the old art of illuminated panels based upon legacy lighting systems, see the apparatus disclosed in U.S. Pat. No. 6,364,273 BI which is directed towards merchandise shelving, in which is disclosed a shelf having a light rail extending along a front edge of the shelf which comprises a cover adapted to reflect light onto displayed merchandise while permitting light to pass through selected window portions to illuminate product and pricing information printed on transparent or translucent signage. Signage may also be supported on a sign strip behind the light rails, and along the front edge of the shelfboard. In the preferred embodiment wire management is provided by a raceway formed between a cover support and a backing strip for the fluorescent tube. A receptacle in communication with the wiring within the raceway is adapted to receive a connector from the ballust transformer, so that all permanent wiring for the fluorescent tube is concealed within the raceway. The ballust transformer can be unplugged from the wall receptacle and from the raceway receptacle, to thus completely remove the ballust transformer from the shelf for repair or replacement. The apparatus of U.S. Pat. No. 6,364,273 BI discloses fluorescent lighting.

Other exemplary legacy systems are also disclosed in U.S. Pat. No. 6,283,608 BI (disclosing a light fixture for shelving) and U.S. Pat. No. 6,755,547 B2 (disclosing a transparent panel illuminated by embedded light sources). Some illuminated panels utilizing LED light sources have recently been conceived; see, for example, U.S. Pat. No. 7,201,487 B2 (disclosing a transparent panel primarily for use in refrigerators in which the panel is illuminated from the side by embedded light sources, said panel further comprising prismatic shapes within said panel such that light is directed through the top or bottom surfaces of said panel).

LED light sources are also well known in the art. LEDs are light sources based upon a semiconductor structure, specifically a diode structure, which emit incoherent light (which may be in the ultraviolet, visible, or infrared spectrum) when electrical current is passed through the semiconductor junction. The original uses of LED light sources were in low-power applications such as indicator lights on instrumentation panels and the like. However, recent developments in LED technology have increased the output power and efficiency of LED sources so that it is now feasible to utilize them in traditional lighting applications previously reserved for incandescent, fluorescent, sodium, and similar lighting technologies. Commercially available LED light sources surpassed incandescent light source in terms of efficiency in or around 2002. More recently, LED light sources have become commercially available which exceed fluorescent light sources in efficiency. Fluorescent light sources typically exhibit around 100 lumens per Watt (lm/W) efficiency; however LED light sources have been recently developed which exhibit 130 lm/W, and there are other LED light sources available and currently in development which exhibit even greater efficiency.

As the output power of commercially available LED light sources has continued to improve, it has become necessary to develop methodologies and structures for removing the heat generated by the LED from the LED semiconductor junction. Typical problems caused by heating of the semiconductor junction and surrounding structure are: 1) failures brought on by such occurrences as non-homogenous distribution of the current density over the junction ("current crowding"), which causes a local hot spot in the diode junction leading to early failure due to thermal runaway; 2) nucleation and growth of dislocations in the active region of the diode in which the radiative recombination occurs due to the existence of an existing defect in the semiconductor crystalline structure and which is accelerated by heat; 3) degradation of materials utilized in the LED, such as phosphor, causing loss of efficiency and changes in output color; and 4) electromigration of metal atoms at the metallization layers of the diode causing growth of conductive "whiskers" and early failure. This is not a complete list of the undesired effects brought on by elevated temperatures; it is provided herein simply as a list of exemplary effects.

As an example of an LED that may be used in illuminated panel applications see the LED part number CL-L822 from Citizen Electronics Co, LTD. This surface mount LED is characterized by data sheets providing information for these products at a temperature of 25° C., or approximately room temperature. It is therefore desirable to operate these products and those like them as close to room temperature as possible. A heat conduction/dissipation apparatus is therefore required in such applications in order to remove heat from the LED in an effort to operate the LED as close to the data sheet temperature as practicable.

Attempts have been made to provide structure for removing the heat from the semiconductor junction of an LED. See, for example, U.S. Pat. No. 6,639,356 B2 (disclosing a heat dissipating base for an LED, and which further states the heat problem created by the use of LEDs in various applications, namely that " . . . Heat generated by LED (sic) becomes the largest drawback in LED manufacturing industry, which causes different malfunctions to the circuitry." U.S. Pat. No. 6,639,356 B2, col. 1. The invention of U.S. Pat. No. 6,639,356 B2 is an attempt to better conduct the heat away from the LED semiconductor junction so as to overcome the problems created by an overheated junction; namely reduced lifetime and output power. However, the invention of U.S. Pat. No. 6,639,356 B2 is directed to a package LED and simply providing a thermally conductive path out of the LED package. It does nothing to address the larger issue of dissipating heat away from the package.

Furthermore, advances in the availability and quality of enviro-friendly materials, including recycled materials such as recycled metals, for example recycled aluminum, and also including organic based resins, for example soy-based urethane, have now made it not only possible but also economically feasible to produce consumer products that are constructed from sustainable resources and at the same time reduce harmful emissions and reduce the carbon footprint.

Soy-based urethanes, for example, may now be used in place of ester-based resins and other urethanes for manufacture of commercial products. Such soy-based urethanes exhibit increased strength to weight ratio, are fabricated from renewable and sustainable resources, specifically soybean oil, require less or even no glass matt and may result in thinner cross sections in the final product, enable faster processing times and therefore higher throughput in production, and produce no Volatile Organic Compounds (VOC) emissions, specifically harmful styrene, during the production process. Furthermore the use of soybean oil based products is advantageous in that it reduces dependence upon foreign source of oil and petroleum products and serves to help insulate from the volatile and increasing price of such petroleum products.

It is therefore desirable that lighted panels should make use of the currently available LED light source technology due to the significant benefits such light sources provide such as extremely long life, ability to control output power and spectrum, and significant reduction in the amount of electrical energy consumed for comparable light output power as compared to traditional light sources. It is also desirable that such panels be sustainably constructed; in other words, be fabricated from renewable and sustainable resources such as materials that are recycled or organically produced materials, or both, so as to require a minimum of new raw materials and thus preserve limited natural resources. It is also desirable that the materials used in the construction of the product be of a nature to assist reducing the carbon footprint by reducing harmful VOC emissions as compared to material traditionally utilized in the production of commercial products.

However, utilizing LED light sources in illuminated panel applications gives rise to the significant challenge of removing the heat from the LED semiconductor junction and surrounding structure. It is thus desirable, and not currently known in the art, that a sustainably constructed heat dissipating apparatus or combination, preferably, but not necessarily, be fabricated at least in part from recycled materials that are a sustainable resource in order to be environmentally friendly, be lightweight, be physically stable and exhibit stiffness and bend resistance so as to be able to bear weight as shelving and to be utilized in architecture, and be conceived and constructed so as to enable the use of LED light sources in illuminated panel applications. It is also desirable that such an apparatus should not be limited to a flat panel shape; in other words, it is desired that it be moldable to a desired shape including three dimensional shapes, curves, and generally non-linear shapes so as to provide the product designer with a great number of options regarding the size and shape of the apparatus.

BRIEF SUMMARY OF THE INVENTION

The present invention solves the afore-mentioned problems in the art by providing a lighted heat dissipating panel comprising a heat dissipating panel in combination with an embedded light source, or a plurality of embedded light sources, in such a manner that heat is conducted away from the light source or sources (in the case of LED light sources the heat is conducted away from the semiconductor junction) and transferred to at least one radiating surface of the panel and may also be conducted through the mounting points of the panel to an external structure. As used herein, "heat dissipating" means that heat energy is conducted away from the heat source and either radiated or conducted into surrounding structure, or both. In accordance with a preferred embodiment of the invention, a core fabricated from expanded or honeycombed recycled aluminum is combined with glass-carbon composite materials to provide a heat dissipating panel allowing heat to be conducted away from the light source or sources; furthermore, this preferred embodiment is fabricated using urethane materials, for example soy-based urethane or functional equivalents as described herein. The use of recycled aluminum allows re-use and recycling of materials, resulting in reduced burden on limited natural resources. The use of soy-based urethane eases the carbon footprint of the product by generating no, or very little, VOC emissions, and enables the invention to be of thinner cross section for a given thickness as compared to other ester-based resins. While it is preferable that soy-based urethane be used it is not strictly necessary; ester resins and other urethane products may be used in the construction of the apparatus.

Recent advances in the availability of certain materials such as carbon or graphite fiber, and in the availability of re-used materials such as recycled aluminum, now make it feasible to construct heat dissipating panels that are lightweight, constructed from sustainable recycled materials, and are of sufficient stiffness to be used as structural components in architectural and shelving applications. The use of recycled materials eases the burden of new construction on precious and expensive natural resources such as aluminum. A panel may be constructed of the afore-mentioned materials, for example, by filling an aluminum honeycomb core with fiberglass, carbon or graphite fiber and bonding such fiberglass, carbon or graphite fiber with carbon material or with a resin such as, for example, ester resins, urethane, and soy-based urethane. Such a structure is lightweight, thermally conductive, machinable, moldable to any desired shape, and stiff.

Carbon composite materials are known in the art and were originally developed for high temperature and high strength aerospace applications. Carbon composites are inherently lightweight; maintain their strength at elevated temperatures (i.e. up to 2500 degrees Fahrenheit); and can be manufactured with low coefficients of thermal expansion, low specific heat, and tailorable thermal conductivity. "Carbon composite materials", as used herein, refer to a predominantly carbon matrix material reinforced with predominantly carbon fibers, and are well known in the art. Carbon composite materials include but are not limited to the class of materials known as carbon-carbon materials. Exemplary embodiments of carbon-composite materials and methods of manufacture are disclosed in U.S. Pat. No. 5,810,556 which is incorporated herein by reference in its entirety; in U.S. Pat. No. 4,225,569 which is incorporated herein by reference in its entirety; and in U.S. Pat. No. 5,071,631 which is incorporated herein by reference in its entirety; but other known carbon composite materials and methods exist and are well known to one skilled in the art. The properties of these materials may be tailored to produce the desired mechanical and physical properties by preferred orientation of the continuous or staple fibers in the composite; and/or by the selection of additives or metric precursors; and/or by thermal treatment of the fibers and matrix before, during, or after fabrication. "Glass-carbon" materials as used herein refer to the class of materials comprising fiberglass and carbon composite materials bonded with carbon, resin, ester resin, urethane, soy-based urethane, or the like. Glass-carbon materials may be cast, molded, or laid up, and are machinable. The surface of carbon composite materials can be also treated and/or coated with a sealant or coating to protect against oxidation or to provide a desired surface finish. Coverings may also be utilized on the surface of the carbon-carbon material to prevent oxidation or provide a desired finish. Such coverings may be applied in the form of one or several layers of fiberglass cloth, matt or the like with an applied coating of resin, including for example but not limited to ester based resins, urethanes, and soy-based urethane; or may be carbon fiber cloth with an applied coating of resin, including for example but not limited to ester based resins, urethanes, and soy-based urethane. Other methods and materials for providing a desired surface finish or protection against oxidation are well known; see, for example, U.S. Pat. No. 5,225,283 which is incorporated herein by reference in its entirety.

A preferred embodiment of the present invention provides electrical connectivity for the power connection of the lighting elements through shelf mounting points by use of ball detent assemblies which are in electrical communication with a power supply and with said lighting elements, thereby eliminating the need for external wiring. Such external wiring is prone to failure, requires the use of external connectors, and is unsightly and thus undesirable in architectural applications.

A further preferred embodiment of the present invention is comprised of LEDs as the lighting element or elements. Additionally, a class of LEDs known as Organic LEDs, or OLEDs, has become commercially available which may also be used as the lighting element or elements. The present invention is not limited to being comprised of inorganic LED light sources; any other light source may be used in alternate embodiments, especially light sources that require heat dissipation to function effectively and efficiently, such as OLEDs, laser diodes, and incandescent light sources; furthermore the present invention is not limited to being comprised of recycled aluminum. Any thermally conductive material may be used in place of the preferred recycled aluminum such as non-recycled aluminum, steel alloys, other metals, and any other thermally conductive structural sheet material.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. First, the construction details of the heat dissipating panel itself are described, followed by a detailed description of the lighted heat dissipating panel apparatus.

a. Heat Dissipating Panel

The heat dissipating panel may be comprised of a structural core in combination with a filler material. The structural core may take a variety of shapes and may be fabricated from a number of different materials as described below and functional equivalents thereof. The filler may be a number of materials as described below, such as glass-carbon material, and the functional equivalents thereof.

Figure 6:
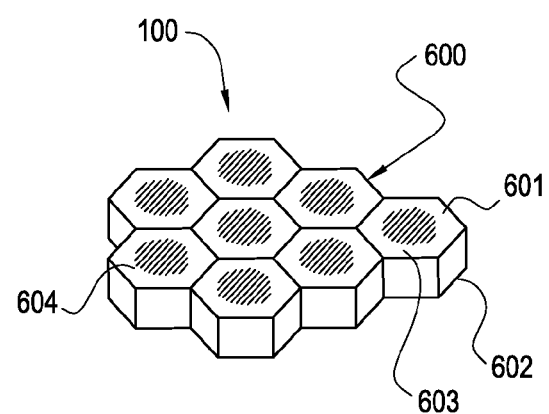
FIG. 6 depicts a cross sectional view of the lighted heat dissipating panel showing a preferred embodiment wherein the heat dissipating panel is comprised of a honeycomb aluminum core in combination with structural material such as carbon composite.

A preferred embodiment of the heat dissipating panel 100 is illustrated in FIG. 6. This embodiment is comprised of a expanded honeycomb aluminum structural core 600 comprising a plurality of cells 603, wherein said cells 603 are essentially filled with filler 604 which is preferably carbon composite material in this preferred embodiment, but may be glass-carbon or any other material or combination that provides structural qualities such that the finished panel exhibits desired qualities of stiffness, weight, and thermal conductivity for the intended application. In a preferred embodiment, the aluminum is expanded recycled aluminum. Heat dissipating panel 100 has an upper surface 601 and a lower surface 602. In the context of the present invention, "essentially filled" means that the carbon composite material occupies the cells 603, but there may be voids within said filler 604. It is not therefore a limitation of the present invention that said filler 604 be free of voids, bubbles, or other gaps or open spaces within cells 603.

While the aforementioned preferred embodiment of the heat dissipating panel 100 is comprised of an expanded honeycomb aluminum core structure essentially filled with carbon composite, it will be appreciated that there exist a number of variations in the shape of the core structure that will be effective for the purposes of the present invention. For example, in the case where the core structure is an expanded structure, the cross section of the openings in the expanded core structure may be square, rectangular, round, oval, or any other open shape which will create an open-cell structure. The depth and material of the expanded core structure may be selected to meet the thermal conductivity and stiffness needs of the user and may be of less depth than the finished panel. In other words, it is not necessary that the expanded core structure extend to the upper and lower surfaces of the panel. As an example, the expanded core structure may be a simple mesh or may be the thicker honeycomb structure as shown in the Figures, or may be a honeycomb structure of any cell cross section. The material used to create the core structure may be any thermally conductive, rigid material such as, for example, any metal including steel or metal alloy, but is preferably recycled aluminum. The wall thickness of the core structure may be selected to achieve a given thermal conductivity, or stiffness, or both. Furthermore, filler 604 may be comprised of any material or combinations of materials that provides the desired weight, stiffness, and thermal conductivity properties for the intended heat dissipating panel application.

A covering layer of fiberglass matt material or carbon matt material may be applied to upper surface 601 and lower surface 602 and bonded to panel 100 by the use of resins, ester resins, urethanes, polyurethanes, soy-based urethanes, and the like. Such coverings serve to reduce oxidation of the filler material and provide a desired surface finish, and are moldable to the shape of the panel, which is not necessarily flat. Such coverings may also extend to any of the sidewalls, providing a complete covering of the panel. A plurality of layers of coverings may be used, and it is not necessary that the same covering material be used on all surfaces of the panel. For instance, carbon cloth or matt material, fiberglass cloth or matt material, or a functional equivalent thereof may be used on a desired surface or surfaces of the panel and carbon cloth or matt material, fiberglass cloth or matt material, or a functional equivalent thereof may be used as the covering material for another surface, or surfaces, of the same panel.

The heat dissipating panel of the invention need not necessarily be flat or rectangular in shape. The structural core may be fabricated to be any desired shape by molding, casting, layup, or other known fabrication techniques for glass-resin construction, including any three dimensional shape, including any curvilinear or desired outline, and may be of any cross section that is sufficient to meet the structural needs of the application. The filler material and covering materials are by their nature moldable, thus the heat dissipating panel of the invention may take any three dimensional or cross sectional shape required by the designer.

The reader will see that, according to a preferred embodiment of the invention, the present invention provides for a thermally conductive, stiff, lightweight heat dissipating panel fabricated partially from sustainable, recycled materials.

b. Lighted Heat Dissipating Panel

The present invention is comprised of said heat dissipating panel described above in combination with a lighting element, which may be a single lighting element or a plurality of lighting elements, to provide the thermally efficient, lightweight, lighted panel described below.

Figure 1:
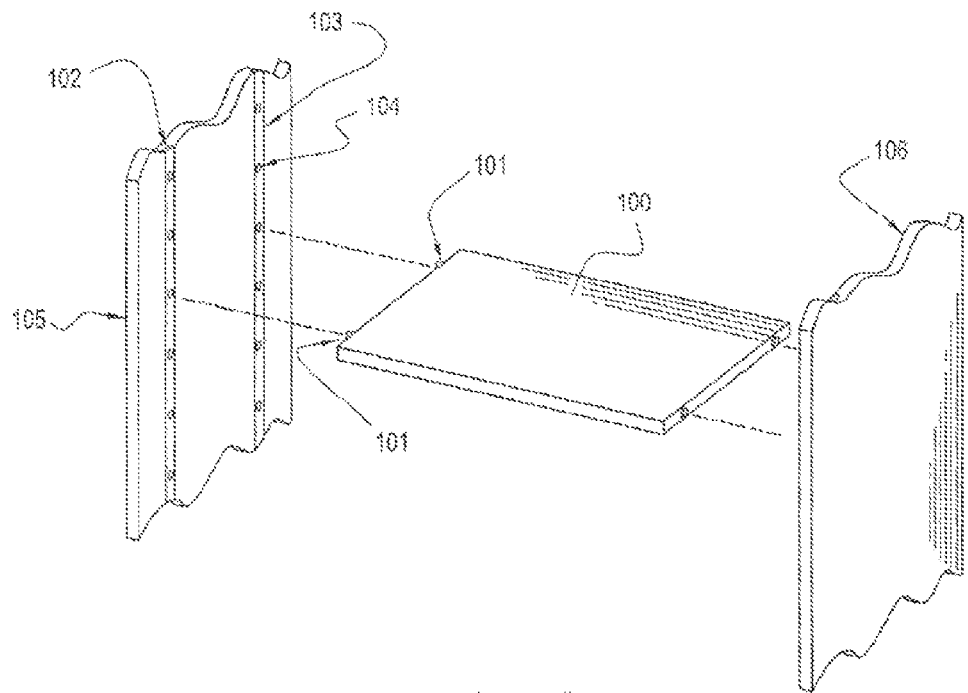
FIG. 1 depicts an orthogonal view of an embodiment of the lighted heat dissipating panel in which electrical connectivity providing electrical power to the lighting elements is provided to the panel through mounting ball detent mounting points.

Referring to FIG. 1, lighted heat dissipating panel 100 has a first mounting edge which is a left mounting surface which is retainingly engaged with a first supporting structure 105 and a second mounting edge which is a right mounting surface which is retainingly engaged with a second supporting structure 106. Said retaining engagement for both said left and said right mounting surfaces may be provided by a number of mechanical structures well known in the art such as a the "L" shaped panel mounting rail 500 shown in FIG. 5 or the U shaped rail 400 shown in FIG. 4, but is preferably a plurality of spring loaded ball detent assemblies 101. A preferred embodiment of the mechanical structure providing the retaining engagement of said heat dissipating panel 100 left and right mounting surface is shown in more detail in FIG. 3. Heat (i.e., radiated heat 202 and conducted heat 203 shown in FIG. 2, for example) is transferred from lighting elements 206 within heat dissipating panel 100 to the first and second supporting structures 105 and 106 as described herein. In this manner, the heat dissipating panel 100 and the first and second supporting structures 105 and 106, which may, for example, be a cabinet or other enclosure, are able to act as a large heat sink for said lighting elements 206 by transfer of heat 202, 203 from the lighting elements 33 to the first and second supporting structures 105 and 106.

Figure 2:
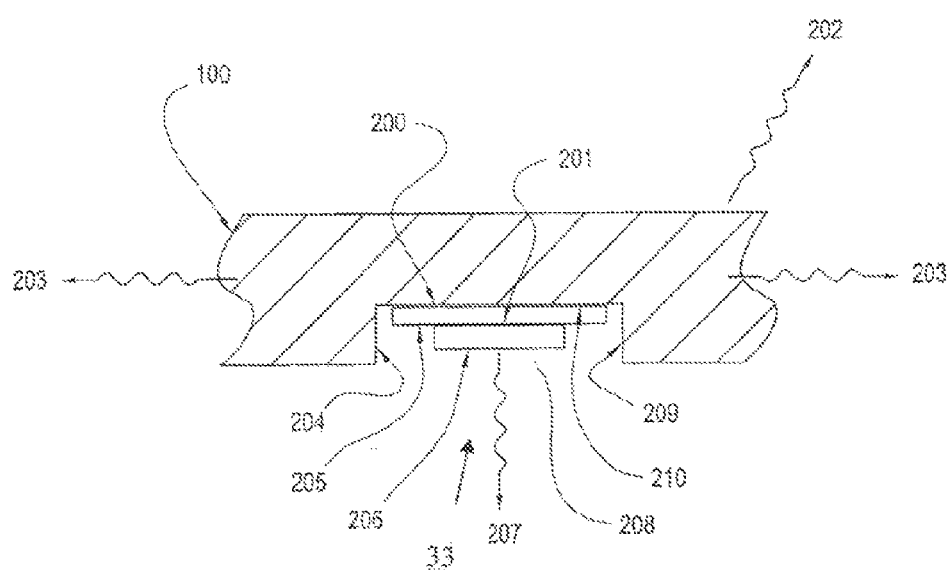
FIG. 2 depicts a cross sectional view of the lighted heat dissipating panel showing details of the lighting element attachment to the panel.

Referring now to FIG. 2, a preferred embodiment of the lighted heat dissipating panel 100 is comprised of a groove 208 having a left groove wall 204 and a right groove wall 209, and further having a bottom surface 200. Lighting element assembly 33 is comprised of a printed circuit board (PCB) substrate 205 having a first surface 201 and a second surface 210, and having conductive traces on said first surface 201 for providing electrical power and ground connections to the lighting elements as is commonly known in the electrical arts. PCB substrate 205 may be a single-layer or multilayer substrate having internal traces on internal layers, and is comprised of any of the known materials used in the electrical arts for PCB substrates including, for example, any of the rigid, flexible, or rigid-flexible PCB materials such as fiberglass, woven glass fabric/epoxy resin, synthetic resin bonded paper, polyimide, bismaleimide triazine epoxy, ceramic, or any other PCB substrate material.

Lighting element assembly 33 is further comprised of either a single or a plurality of lighting elements 206 mounted to said PCB first surface 201 so as to achieve electrical connectivity with conductive traces on said PCB first surface 201 as is known in the art to provide electrical power so said lighting elements 206, and preferably to provide a thermal conduction to said PCB first surface 201. Said lighting element 206 is an electric circuit element having two electrical terminals, and which emits light when a voltage is applied across said terminals. Lighting element 206 is adapted to mount to said PCB first surface 201 by any of the techniques well known in the electrical arts including, but not limited to, surface mount packaging and through-hole mount packaging. Surface mount packaging, which is well known in the art of electronic assembly, is a preferred embodiment of the present invention due to its reduced size and increased ease of assembly over through hole mount packaging. Lighting element 206 is mounted to said PCB first surface 201 by any of the techniques well known in the electrical arts for mounting electronic components to PCB substrates so that said lighting element electrical connections are in electrical communication with said PCB conductive traces, which techniques include, but are not limited to, soldering, bonding using electrically conductive bond agents, and the like. In this manner electrical power is provided to the lighting elements 206. Bond agents such as non-conductive epoxy may also be used to further secure the lighting elements 206 to PCB substrate 205. Such bond agents may be utilized, for instance, in applications in which the lighted panel 100 may be subjected to a physical environment, for example vibration, which requires additional mechanical strength in retaining said lighting elements 206 to said PCB substrate 205.

Still referring to FIG. 2, said PCB substrate second surface 210 is in direct contact with said groove bottom surface 200 and is attached thereto by any of the attaching means known in the art such as, for example, chemical bonding or threaded fasteners. A preferred embodiment of said attaching means is one in which said PCB substrate second surface 210 is bonded to said groove bottom surface 200 by chemical structural/ thermal conductive bonding means, for example epoxy bonding agents, or more specifically thermal epoxy bonding agents. Said attaching means may be any of the PCB attaching means known in the art.

Figure 3:
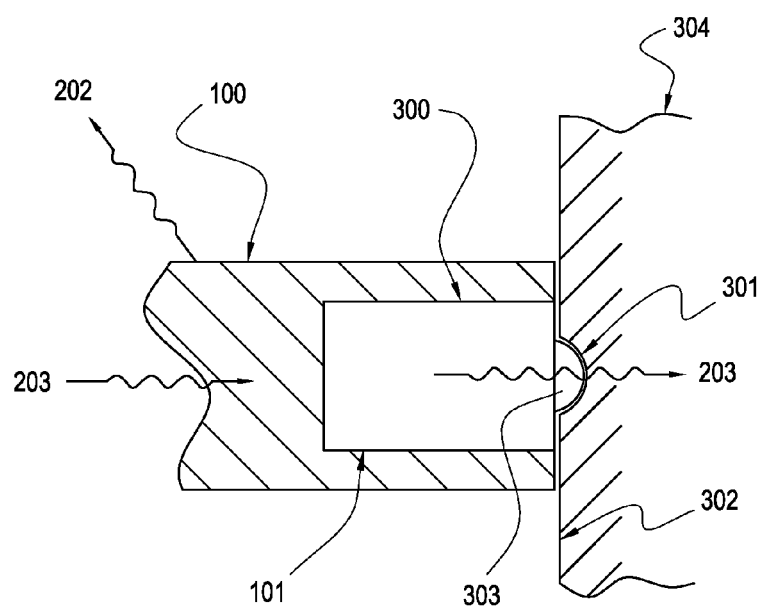
FIG. 3 depicts a cross sectional view of an embodiment of the lighted heat dissipating panel in which a ball detent assembly is utilized to mount the shelf to the supporting structure.

Referring now to FIG. 3, a preferred embodiment of the mechanical retaining structure is comprised of a ball detent assembly 101, preferably a spring loaded ball detent assembly, which is retained within a cavity 300 adapted to accept said ball detent assembly 101 in heat dissipating panel 100. The ball detent assembly 101 includes a thermally conducting ball 303 received in an accepting detent 301 along an accepting surface 302 of a supporting structure 304. As shown in FIG. 3, radiated heat 202 is radiated from the heat dissipating panel 100 and conducted heat 203 is conducted away from the panel 100 to the supporting structure 304, for example. The present invention may be comprised of a plurality of ball detent assemblies. Ball detent assemblies have been used for years and are known in the mechanical arts. The embodiment shown in FIG. 3 may be, but is not necessarily, one in which electrical conduction means providing electrical power to the lighting elements 206 is achieved by establishing electrical conductivity through ball detent assemblies 101, or by means of a pigtail, as described herein.

Figure 7:
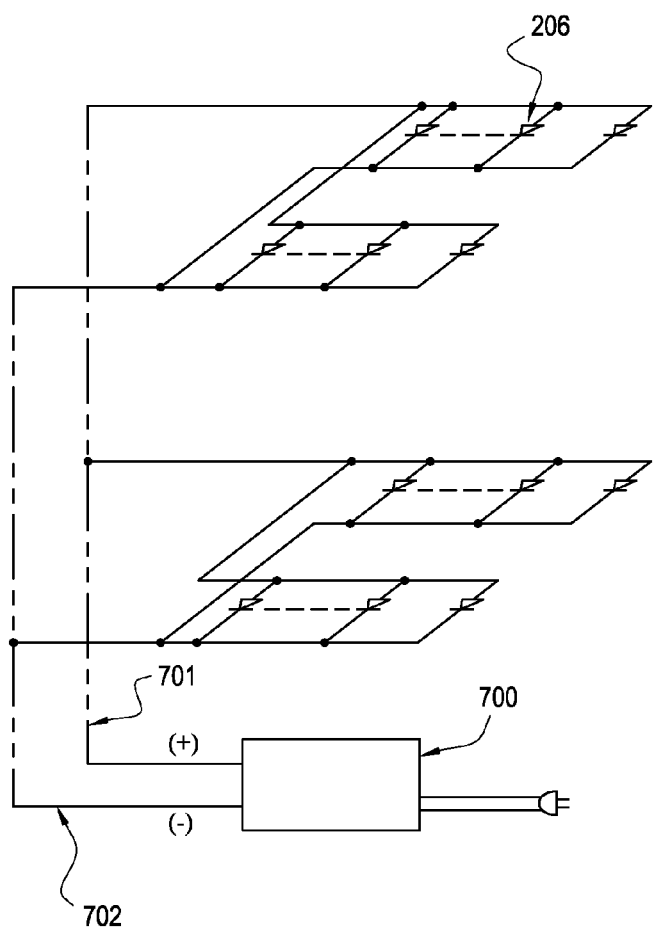
FIG. 7 depicts a schematic diagram of the lighted heat dissipating panel in electrical communication with a power source.

A further preferred embodiment of the mechanical retaining structure is one in which electrical power is provided to the lighting elements 206 by electrical power conduction means which comprises electrical connectivity through the ball detent assemblies 101. Referring now to FIG. 1, vertical mounting rails 102 and 103 are electrically conductive and electrically energized in accordance with the schematic diagram in FIG. 7 (to be discussed in detail later). Conductive vertical mounting rails 102 and 103 are in electrical communication with ball detent assemblies 101 such that the circuit of FIG. 7 is implemented. Electrical connectivity from ball detent assemblies 101 to PCB substrate 205 is achieved by means for providing such electrical connectivity that are known in the art such as, for example, embedded wiring which is electrically attached to PCB substrate 205 and ball detent assemblies 101 by electrical connection means such as soldering, electrical connectors, or press mechanical fit between electrically conductive surfaces. The lighting elements 206 may be connected in accordance with the schematic diagram shown in FIG. 7, or in any other configuration which provides power to the lighting elements 206 such that they operate to emit light 207 when power is applied.

Figure 5:
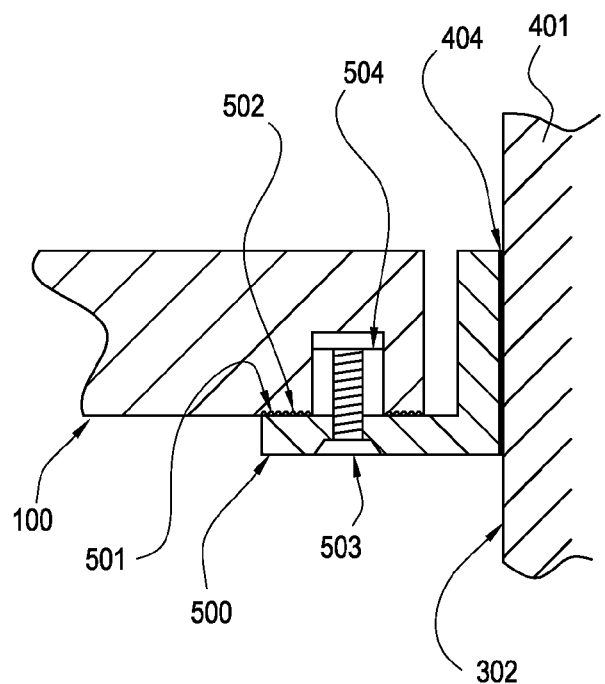
FIG. 5 depicts an alternate embodiment of the mounting point comprising a panel mounting rail of "L" cross section.

An alternate embodiment of the lighted heat dissipating panel 100 is shown in FIG. 5. Heat dissipating panel 100 is secured to "L" shaped mounting rail 500 by any connecting means known in the art, shown in FIG. 5 as a screw 503, preferably a countersunk screw, which is threadingly engaged with the panel 100 by use of threaded insert 504. It is not necessary that a threaded insert be used; an alternative embodiment is one in which the receiving threads are machined into the heat dissipating panel 100. In this manner a secure mechanical attachment is made between the heat dissipating panel 100 and mounting rail 500, which attachment also provides a thermal path for heat conduction from the heat dissipating panel 100 to a supporting structure 401. The mounting rail 500 is further attached to the panel 100 using an adhesive 501. Heat is transferred from the panel 100 to the mounting rail 500 at a heat transfer surface 502. The mounting rail 500 may be attached to the supporting structure 401 by any of the well known mechanical attachment means known in the art such as, for example, threaded fasteners, chemical bonding 404 using bonding agents such as epoxy, riveting, or welding. Electrical power conduction means (not shown in FIG. 5) provides electrical power to the PCB substrate 205 (shown in FIG. 2, for example). Said electrical power conduction means may be electrically connected to said PCB by any of the known connection means known in the art such as, for example, soldering and use of connectors.

Figure 4:
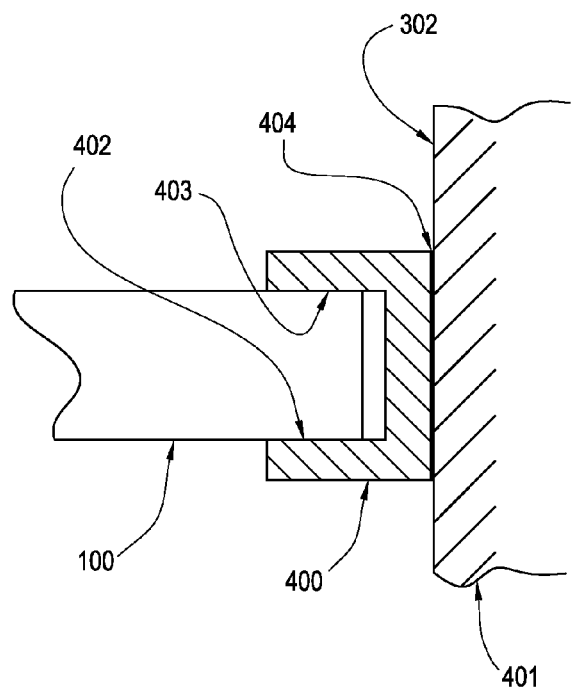
FIG. 4 depicts an alternate embodiment of the mounting point comprising a panel mounting rail of "U" cross section.

A further alternate embodiment of the lighted heat dissipating panel 100 is shown in FIG. 4. Heat dissipating panel 100 is slidingly engaged with "U" shaped mounting rail 400. Panel 100 thus transfers heat to the surrounding structure 401 through a first heat transfer surface 402 and a second heat transfer surface 403. Mounting rail 400 may be attached to the supporting structure 401 by any of the well known mechanical attachment means known in the art such as, for example, threaded fasteners, chemical bonding 404 using bonding agents such as epoxy, riveting, or welding. Electrical power conduction means provides electrical power to the PCB substrate 205. Said electrical power conduction means is comprised of electrical wiring comprised of a first wire in electrical communication with said PCB substrate 205 and having a first end and a second end, and a second wire in electrical communication with said PCB substrate 205 and having a first end and a second end, wherein said first end of said first wire and said first end of said second wire are in electrical communication with said PCB substrate 205 and wherein said second end of said first wire and said second end of said second wire are terminated in either bare wires, or stripped as is commonly known, or are connectorized for attachment to an external power source such as a power supply 700 as shown in FIG. 7 via positive (+) and negative (−) terminal connections 701 and 702. Such electrical connection configurations are commonly known as "pigtails" in the art. Said first end of said first wire and said first end of said second wire means may be electrically connected to said PCB substrate 205 by any of the connection means known in the art such as, for example, soldering and use of connectors.

Referring now to FIG. 7, a plurality of lighting elements 206 may be in electrical communication with each other and a power supply 700 via vertical mounting rails 102 and 103 in electrical communication with positive (+) and negative (−) terminals 701 and 702 of the power supply 700 receiving alternate current (AC) power.

Figure 8:
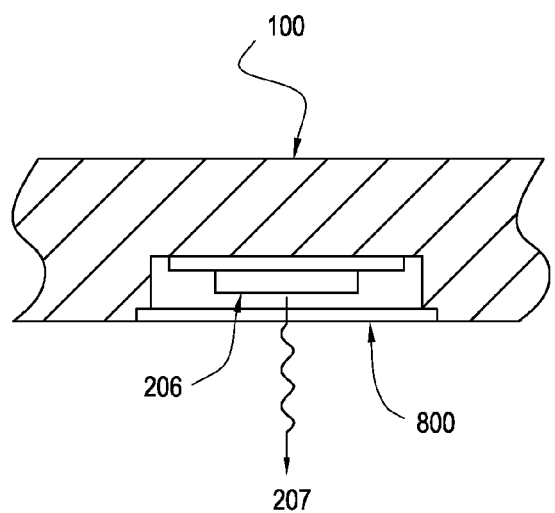
FIG. 8 depicts an embodiment of the lighted heat dissipating panel further comprising an optical window.

Referring now to FIG. 8, a further alternate embodiment of the lighted heat dissipating panel comprises a window 800 comprised of transparent material enclosing groove 208. Said transparent material may be glass, plastic such as, for example polycarbonate or acrylic, quartz, silicone, or any other stiff transparent material known in the art. Window 800 is attached to heat dissipating panel 100 by chemical bonding using bonding agents known in the art, by use of threaded fasteners, by press fit, or by use of mechanical retainers as is known in the art. Light 207 emitted from the lighting element 206 of the panel 100 can be seen through the window 800.

The lighted heat dissipating panel 100 described herein may be used in any application in which it is desired that an illuminating surface be present. When used as an illuminated shelf, for example in a cabinet, the lighted heat dissipating panel 100 is utilized with said groove opening in a downward direction, thereby providing illumination to the area underneath the shelf. It is readily seen that this application of the invention provides illumination for uses such as merchant display cases, refrigerator shelving, curio cabinets, and the like. When used as an architectural element, the lighted heat dissipating panel 100 is utilized to provide a desired amount of lighting of a desired spectrum as required by the designer such that a specific lighting effect is achieved. For such applications the lighted heat dissipating panel 100 may be incorporated directly into walls, ceilings, furniture, structural elements, handrails, cabinetry, flooring, or hung or mounted on any of these surfaces or any other surface to provide the desired lighting effect. The lighted heat dissipating panel 100 may also be used as a lighted visor in vehicle applications wherein said lighting elements may be either oriented upwards to provide indirect lighting to the vehicle interior, or downwards to provide direct lighting to the vehicle interior. The applications of the lighted heat dissipating panel 100 given herein are exemplary; it is readily seen that the lighted heat dissipating panel 100 of the present invention is useful in any application requiring a panel with integrated lighting.

While the above description of the various embodiments contains much specificity, these should not be construed as limitations on the scope of any embodiment, but as examples of the presently preferred and exemplary alternative embodiments thereof. For example the Figures herein disclose a generally rectangular panel shape of uniform cross section; however, the rectangular shape shown is exemplary only and it is easily understood that the present invention is not limited to a rectangular or polygon shape, nor is it limited to a uniform cross section. The lighted heat dissipating panel 100 of the present invention may take any shape desired by the user, including any shape in which the outline of the panel is curvilinear, and furthermore the panel may be of non-uniform cross section. Many other variations are possible within the disclosure of the various embodiments disclosed herein. The scope of the invention should thus be determined by the appended claims and their legal equivalents, and not solely by the examples given.

What is claimed is:

1. A lighted heat dissipating panel, comprising
a heat dissipating panel comprising an expanded aluminum honeycomb structure substantially filled with glass-carbon material, said heat dissipating panel having a top surface and a bottom surface, and further having at least one groove for accepting a lighting element assembly, said groove having a bottom surface and an opening, and said heat dissipating panel further having a first mounting edge and a second mounting edge;
at least one lighting element assembly comprising a printed circuit board substrate having a first surface and a second surface, said printed circuit board first surface comprising conductive traces in electrical communication with at least one lighting emitting diode, and wherein said printed circuit board second surface is attached to said groove bottom surface; and
a plurality of ball detent assemblies retainingly engaged in said first mounting edge, and a plurality of ball detent assemblies retainingly engaged in said second mounting edge, said ball detent assemblies in electrical communication with said light emitting diodes.

2. The lighted heat dissipating panel of claim 1, wherein said aluminum is recycled aluminum.

3. The lighted heat dissipating panel of claim 2, wherein said top surface further comprises at least one layer of structural cloth selected from the group consisting of fiberglass and carbon fiber, wherein said structural cloth is bonded to said top surface by a bonding agent selected from the group consisting of epoxy resin, ester resin, urethane, and soy-based urethane, and wherein said bottom surface further comprises at least one layer of structural cloth selected from the group consisting of fiberglass and carbon fiber, wherein said structural cloth is bonded to said bottom surface by a bonding agent selected from the group consisting of epoxy resin, ester resin, urethane, and soy-based urethane.

4. The lighted heat dissipating panel of claim 3, wherein said light emitting diode is an organic light emitting diode.

5. The lighted heat dissipating panel of claim 1, further comprising a transparent window enclosing said groove opening.

6. The lighted heat dissipating panel of claim 1, wherein said top surface further comprises at least one layer of structural cloth selected from the group consisting of fiberglass and carbon fiber, wherein said structural cloth selected from the group consisting of fiberglass and carbon fiber, wherein said structural cloth is bonded to said top surface by a bonding agent selected from the group consisting of fiberglass and carbon fiber, wherein said structural cloth is bonded to said bottom surface by a bonding agent selected from the group consisting of epoxy resin, ester resin, urethane, and soy-based urethane.

7. The lighted heat dissipating panel of claim 6, wherein said light emitting diode is further comprised of surface mount packaging.

* * * * *